US009424169B1

(12) United States Patent
Galburt

(10) Patent No.: US 9,424,169 B1
(45) Date of Patent: Aug. 23, 2016

(54) METHOD OF INTEGRATING HETEROGENEOUS TEST AUTOMATION FRAMEWORKS

(71) Applicant: EMC Corporation, Hopkinton, MA (US)

(72) Inventor: Mikhail Galburt, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 14/285,229

(22) Filed: May 22, 2014

(51) Int. Cl.
*G06F 11/00* (2006.01)
*G06F 11/36* (2006.01)

(52) U.S. Cl.
CPC ........ *G06F 11/3688* (2013.01); *G06F 11/3692* (2013.01)

(58) Field of Classification Search
CPC ............ G06F 11/3692; G06F 11/3664; G06F 11/3688
See application file for complete search history.

(56) References Cited

U.S. PATENT DOCUMENTS

| | | | | |
|---|---|---|---|---|
| 8,904,353 | B1* | 12/2014 | Arguelles | G06F 11/3672 717/124 |
| 2004/0010735 | A1* | 1/2004 | Paternostro | G06F 11/3684 714/38.14 |
| 2005/0193291 | A1* | 9/2005 | Subramanian | G06F 11/3664 714/710 |
| 2007/0038890 | A1* | 2/2007 | El Far | G06F 11/3688 714/25 |
| 2007/0162894 | A1* | 7/2007 | Noller | G06F 11/3688 717/124 |
| 2013/0042222 | A1* | 2/2013 | Maddela | G06F 8/70 717/124 |
| 2013/0339933 | A1* | 12/2013 | Walters | G06F 8/70 717/131 |
| 2014/0123114 | A1* | 5/2014 | Navalur | G06F 11/3688 717/127 |
| 2014/0282421 | A1* | 9/2014 | Jubran | G06F 11/3664 717/126 |
| 2014/0380278 | A1* | 12/2014 | Dayan | G06F 11/3692 717/124 |

* cited by examiner

*Primary Examiner* — Yolanda L Wilson
(74) *Attorney, Agent, or Firm* — Blakely, Sokoloff, Taylor & Zafman LLP

(57) ABSTRACT

Techniques for testing heterogeneous software components are described herein. In response to a test procedure, a main test framework (MTF) identifies one or more test cases associated the sequence of testing operations. The MTF delegates at least one testing operation to a first subordinated test framework (STF) by invoking an MTF-to-STF (MTF/STF) adaptor, where the first STF corresponds to a test operation of a specific functionality. The MTF/STF adaptor launches the first STF by passing a first set of parameters received from the MTF to a first format compatible with the first STF, where the first STF is configured to perform a first sequence of testing operations for a first functionality. In response to a first test result from the first STF, the MTF/STF adaptor converts the first test result in second format compatible with the MTF and returns the converted first test result back to the MTF.

22 Claims, 6 Drawing Sheets

METHOD OF INTEGRATING HETEROGENEOUS TEST AUTOMATION FRAMEWORKS

FIELD OF THE INVENTION

Embodiments of the present invention relates generally to developing test cases used to test an application or software. More particularly, embodiments of the invention relate to integrating heterogeneous test frameworks.

BACKGROUND

In software engineering, testing is an integral part of the development cycle of an application or software. For this, testing an application or software involves generating test cases where each test case tests a certain functionality of the application or software. Often this involves invoking other aspects of the application or software. Code or scripts are written to develop each test case based on a specific test case logic/scenario. Further, scripts can be written to automate the testing process. However, writing individual testing logic for each test case often becomes a laborious and time consuming process. Furthermore, maintenance of automated test cases or test suites designed with traditional methods are also time consuming as any changes in functionality of Application Under Test (AUT) requires update/modification of multiple test case scripts.

FIG. 1 is a block diagram illustrating automated testing of an AUT using known traditional methods. Referring to FIG. 1, framework 102 includes framework engine 104 interacting with the framework library 106. Framework library 106 includes functions or procedures provided within a framework function library 108 where all the functions needed to test an AUT are provided. Test repository 110 includes one or more test suites 112. Each test suite 112 includes scripts/code logic for one or more test cases 114, each test case 114 testing a functionality or aspect of the AUT. In traditional methods, function library 106 is directly used (called) from test case 114 script of a test suite 112.

Framework 102 represents a general test automation framework including three main components, framework engine 104, framework library 106 (representing a collection of framework function library 108) and a test repository 110. The framework engine 104 represents the main script that configures environment for execution, runs the test suites 112 which represents a sequence of test cases 114, and is responsible for the output results or reports of test execution. The framework library 106 includes framework function library 108 which represents a collection of scripts that cover general functions or procedures required by the test cases/scenarios (e.g. data transformation, search processing, common command execution with parameters, etc.). With traditional test automation methods these functional scripts are utilized within test case's scripts to partially eliminate redundancy of the code.

The test repository 110 represents a collection of automated test cases usually grouped by test suites 112 to assist in maintenance. A test suite 112 represents a container for test cases 114 that are used for testing specific functionality, or a specific aspect of the AUT. Usually, grouping test cases 114 in test suite 112 helps in maintenance and planning for test coverage. However, such maintenance and planning can be limited in large scale application development if a functionality or aspect of the AUT changes during development.

Traditionally, test automation of heterogeneous software products (components) was developed separately utilizing appropriate tools (frameworks). Such approach is limited to testing homogeneous software products (or functionalities) within single test case and does not support complex test scenarios. For example, test automation frameworks designed to work with distributed test environment (over the network) through command line interface (CLI) does not support testing software products through graphical user interface (GUI), and test automation frameworks designed for GUI testing has very limited support for CLI and remote, over the network, execution.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
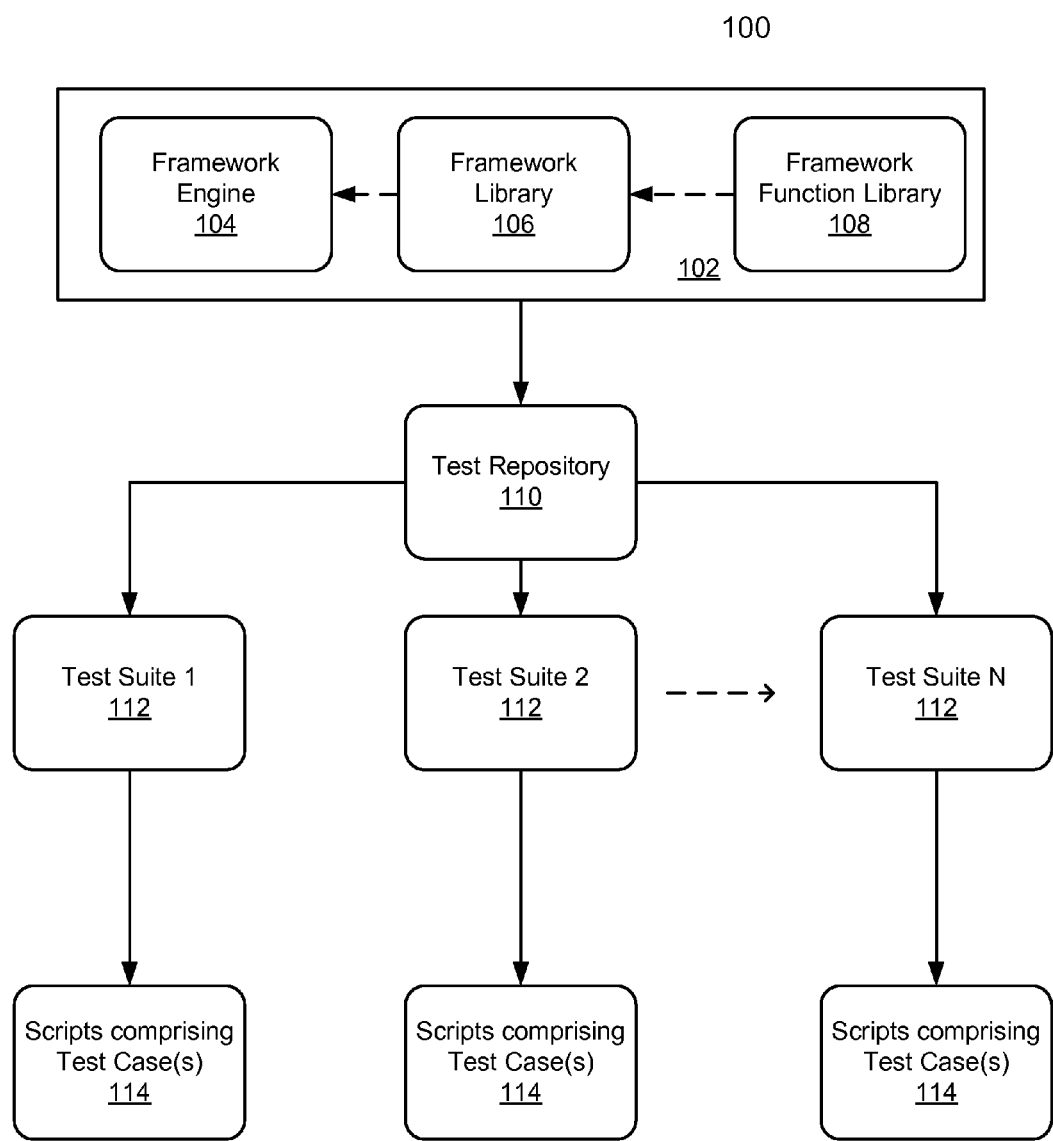
FIG. 1 is a block diagram illustrating automated testing of an AUT using known traditional methods.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an integrated heterogeneous automated testing platform is designed and implemented for test automation of software functionalities. It can be used for test automation of complex test scenarios that involve multiple test steps, such as those utilize a command line interface (CLI) with one software component and a graphical user interface (GUI) with another software component within the same test scenario. A main test framework (MTF) is responsible for execution CLI-based test operations on a distributed test environment and, when it is needed, calls a specialized framework for GUI-based test operations. The integration is designed such a way that the test automation framework for GUI-based test operations is considered as a subordinated test framework (STF) and returns a test result to the MTF for considerations on test continuation and result reporting.

The integration of heterogeneous test automation frameworks provides an efficient foundation for test automation of complex scenarios that involve heterogeneous software components or applications under test (AUT). In one embodiment, an adaptor, an interface module that provides communication and data transformation between an MTF and one or more STFs are utilized. The adaptor covers all necessary processes and transformations to supply an STF with needed configurations, variables and commands to execute specified test operations, and to return results of execution to the MTF. Such a platform generalizes processes and functionality required for integration heterogeneous frameworks and can be used for test automation of diverse software products. Specific adaptor implementation may be varied and depends on nature of test automated frameworks that are integrated. As a result, a test automation designer is able to automate complex test scenarios involved heterogeneous AUTs and execute automated scripts developed in heterogeneous frameworks within single test case. Test automation of specific AUTs (or functionalities required heterogeneous AUTs) is simplified as integration of heterogeneous frameworks happens "on the fly" (e.g., behind the scene) without the user intervention and with a single entry and exit points for complex test scenarios.

Figure 2:
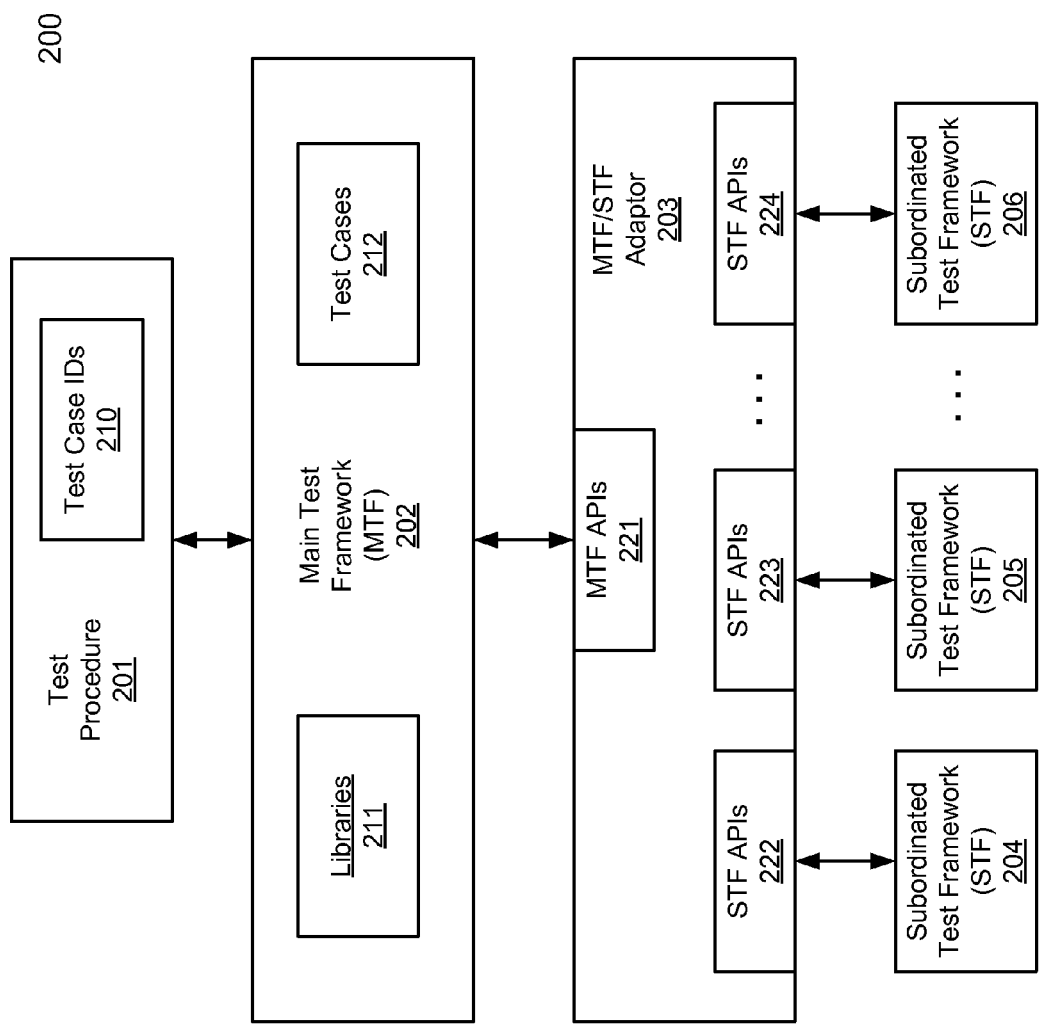
FIG. 2 is a block diagram illustrating a heterogeneous automated test platform according to one embodiment of the invention.

FIG. 2 is a block diagram illustrating a heterogeneous automated test platform according to one embodiment of the invention. Referring to FIG. 2, integrated test system 200 includes, but is not limited to, MTF 202 communicatively coupled to multiple STFs 204-206 via MTF/STF adaptor 203. In one embodiment, in response to test procedure 201, MTF parses test procedure 201 to identify, amongst other, a list of test cases based on test case identifies (IDs) 210. Test case IDs 210 identify a set of previously configured test cases 212 associated with MTF 202. In one embodiment, test cases 212 may be executed by MTF 202 by executing one or more libraries 211 to perform certain testing operations of certain functionalities. Some of test cases 212 and/or libraries 211 may be configured to perform testing of some standardized or general functionalities.

Some of the libraries 211 may require specific testing operations that are specific to some specific types of functionalities. Such specific testing operations may be delegated to one or more of STFs 204-206. For example, during execution of one of test cases 212, a testing function of a corresponding one of libraries 211 calls another function that is provided by an STF, for the purpose of illustration a function of STF 204. In response to a request for invoking STF 204, MTF 202 starts or launches MTF/STF adaptor 203 and sends the request with a set of parameters to MTF/STF 203 via MTF APIs 221 of MTF/STF adaptor 203. In response, MTF/STF adaptor 203 identifies STF 204 based on the request. MTF/STF adaptor 203 launches and starts STF 204. MTF/STF adaptor 203 converts the set of parameters received from MTF 202 via APIs 221 to a format that is compatible with STF 204. MTF/STF adaptor 203 then invokes STF 204 by calling STF APIs 222 and passing the converted parameters to STF 204.

Once STF 204 completes the testing operations, STF 204 returns a test result back to MTF/STF adaptor 203 via STF APIs 222. MTF/STF adaptor 203 then reformats the test result received from STF 204 to a format compatible with MTF 202, and returns the converted test result back to MTF 202. Similarly, if MTF 202 invokes subordinated testing services from STF 205-206, MTF/STF adaptor 203 is configured to perform similar operations as described above, where MTF/STF adaptor 203 communicates with STFs 205-206 via STF APIs 223-224, respectively.

In one embodiment, STFs 204-206 are heterogeneous STFs that are responsible for perform different subordinated testing operations. For example, STF 204 may be configured to test a command line interface (CLI) operations used by a software program, while STF 205 may be configured to test graphical user interface (GUI) operations used by a software program. APIs 222-224 for accessing STFs 204-206, respectively, may be different. In some situations, STFs 204-206 may be developed and provided by different vendors or software utility providers (e.g., third-party providers). For example, any of STFs 204-206 may be a Quick Test Professional™ (QTP) application developed by Hewlett-Packard® or an open source SIKULI™ application. By utilizing MTF/STF adaptor 203, heterogeneous STFs 204-206 can be integrated with MTF 202. With the architecture as shown in FIG. 2, an additional STF can be added by simply adding the corresponding STF APIs in MTF/STF adaptor 203, without having to change MTF 202. Thus, MTF/STF adaptor 203 provides a single entry and exit point to MTF 202 to access multiple different (e.g., heterogeneous) STFs 204-206. Note that the configuration of MTF/STF adaptor 203 is illustrated and shown for illustration purpose only. MTF/STF adaptor 203 can be implemented in multiple adaptors, each corresponding to one of the STFs 204-206. When a particular STF is invoked, the corresponding adaptor is utilized.

Figure 3:
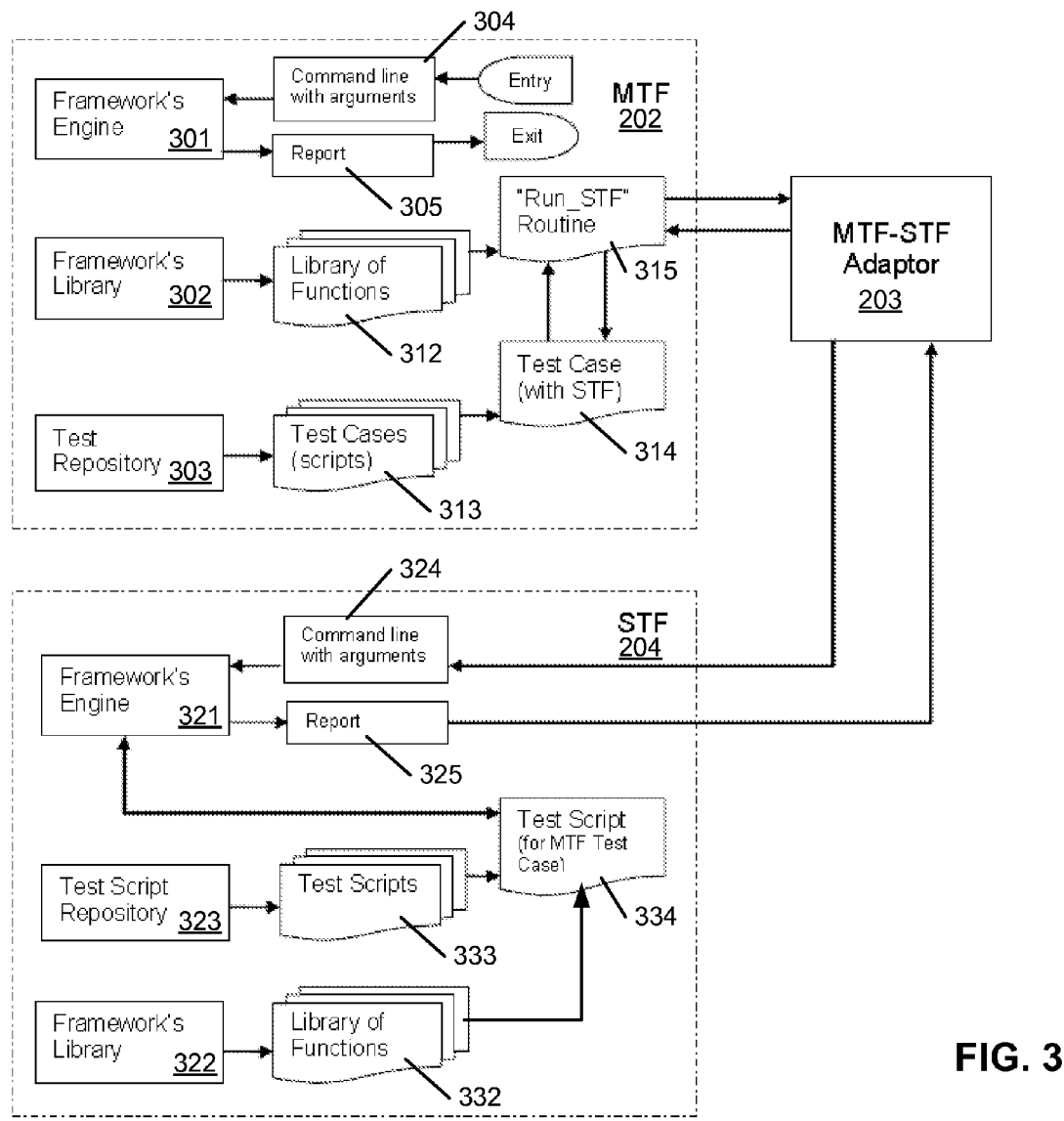
FIG. 3 is a block diagram illustrating an example of a main test framework communicatively coupled to a subordinated test framework according to one embodiment of the invention.

FIG. 3 is a block diagram illustrating an example of a main test framework communicatively coupled to a subordinated test framework according to one embodiment of the invention. Referring to FIG. 3, although there is only one STF (e.g., STF 204) shown, MTF 202 can be coupled to multiple STFs via MTF/STF adaptor 203 as described above. In one embodiment, MTF 202 includes framework engine 301, one or more framework libraries 302, and test repository 303. Framework engine 301 is to configure an operating environment for execution, execute a test case or a test suite of multiple test cases, and output a test result of test execution for MTF 202. Framework library 302 includes a collection of test routines (e.g., scripts) and utilities that cover general procedures or functions required by testing scenarios (e.g. data transformation, search processing, common command execution with parameters, etc.). These functional routines and utilities are utilized by multiple test cases to eliminate redundancy of the code for repeating or similar functions. Test repository 303 includes a collection of automated test cases usually grouped with one or more test suites to simplify maintenance. A test suite is container for one or more test cases that used for testing specific functionality of specific part of an application under test (AUT). Grouping test cases that are related, commonly used, or associated with a test scenario in a test suite helps in maintenance and planning.

Similarly, STF 204 includes framework engine 321, one or more framework libraries 322, and test repository 323. Similar to framework engine 301, framework engine 321 is to configure an operating environment for execution, execute a test case or a test suite of multiple test cases, and output a test result of test execution for STF 204. Framework library 322 includes a collection of test routines (e.g., scripts) and utilities that cover general procedures or functions required by testing scenarios (e.g. data transformation, search processing, common command execution with parameters, etc.) for testing the specific functionalities (e.g., GUI or CLI) represented by STF 204. These functional routines and utilities are utilized by multiple test cases to eliminate redundancy of the code for repeating or similar functions. Test repository 323 includes a collection of automated test cases for the STF 204.

According to one embodiment, when MTF 202 receives a test procedure, such as test procedure 201, from a user such as a test engineer or quality assurance (QA) engineer, MTF 202 parses the test procedure and passes testing parameters through interface 304, in this example a command line interface. The input parameters may include test case identifier(s) identifying some of the test cases previously configured as part of test cases 313 and stored in test repository 303. In response to input parameters, framework engine 301 identifies and retrieves the related test case(s) 313 from test repository 303, and executes the retrieved test case(s) 313. Some of the test cases 313 specify some functions or routines 312 to be invoked, which will be identified and executed by framework engine 301.

Figure 4:
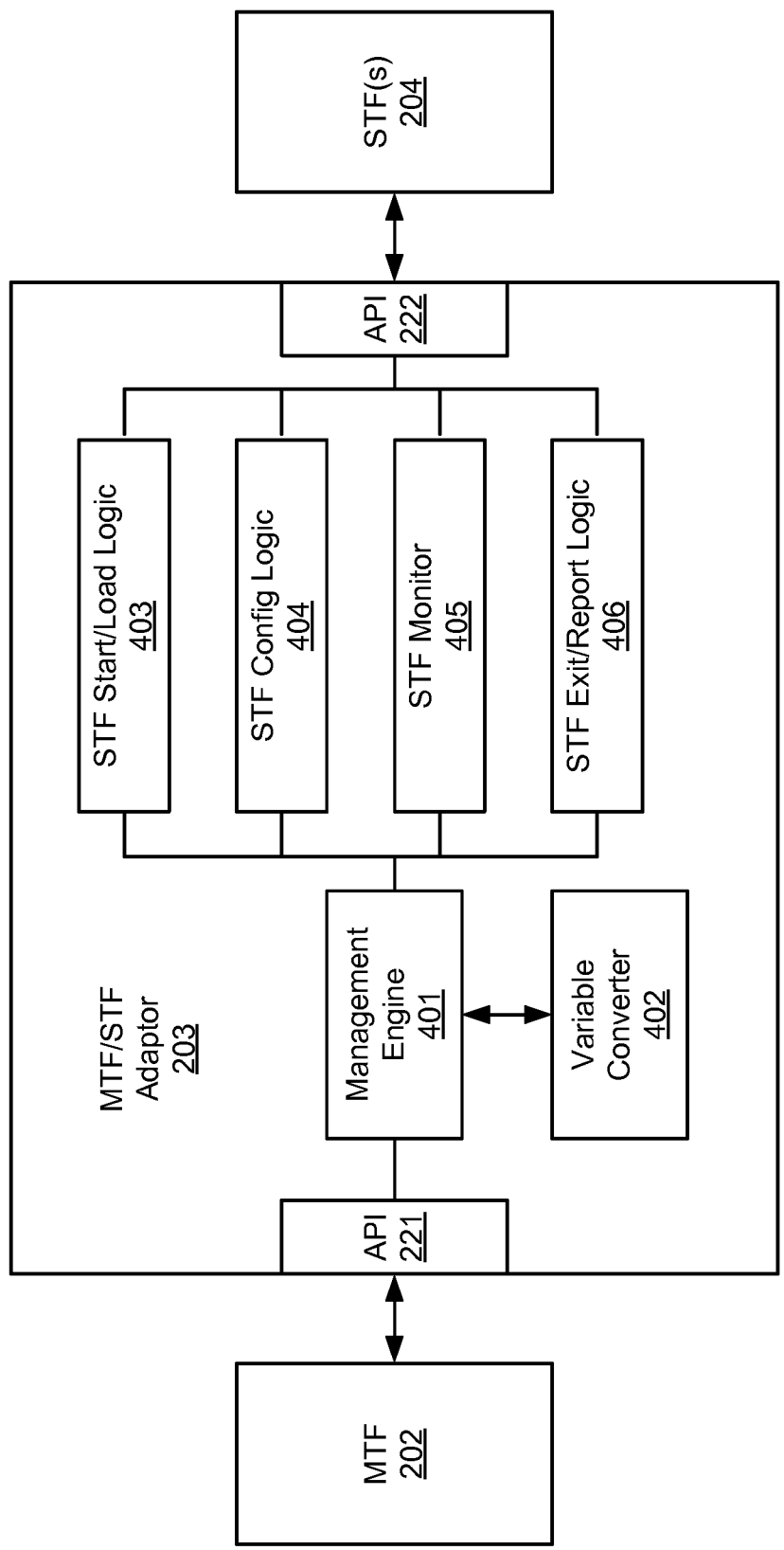
FIG. 4 is a block diagram illustrating an example of a main test framework to subordinated test framework adaptor according to one embodiment of the invention.

In one embodiment, if there is a test case, in this example, test case 314, that requires invoking one or more functions or routines of a STF, framework engine 301 executes an invoking routine, in this example, routine 315, to invoke the corresponding STF. The invoking routine then starts and communicates with MTF/STF adaptor 203, including passing the necessary information and parameters to MTF/STF adaptor 203. In response, as shown in FIG. 4, management engine 401 of MTF/STF adaptor 203 identifies an STF, in this example, STF 204, based on the information received from invoking routine 315. STF start logic 403 then launches and starts STF 204 and STF configuration logic 404 configures STF 204 and passes the information and parameters to STF 204 that has been converted by converter 402 to a format compatible with STF 204. STF monitor 405 is to monitor and wait for the test result provided by STF 204.

Referring back to FIG. 3, in response to information and parameters 324 received from MTF 202, framework engine 321 identifies the associated test scripts 333 from test script repository 323 and executes them one at a time (e.g., test script 334) using functions 332 provided by function library 322. The test result is reported by framework engine 321 as part of report 325 back to MTF/STF adaptor 203. Referring now to FIG. 4, the test result is received by STF exit and report logic 406 of MTF/STF adaptor 203. The test result is then converted by converter 402 to a format compatible with MTF 202 and the converted result is then delivered to MTF 202. Thereafter, STF exit/report logic 406 may terminate and unload STF 204. Referring back to FIG. 3, in response to the test result received from MTF/STF adaptor 203, framework engine 301 returns the test result as part of report 305 back to the client. Note that the test routines or procedures may be programmed using a variety of script languages, such as, for example, TCL™ script language or VBScript™.

Figure 5:
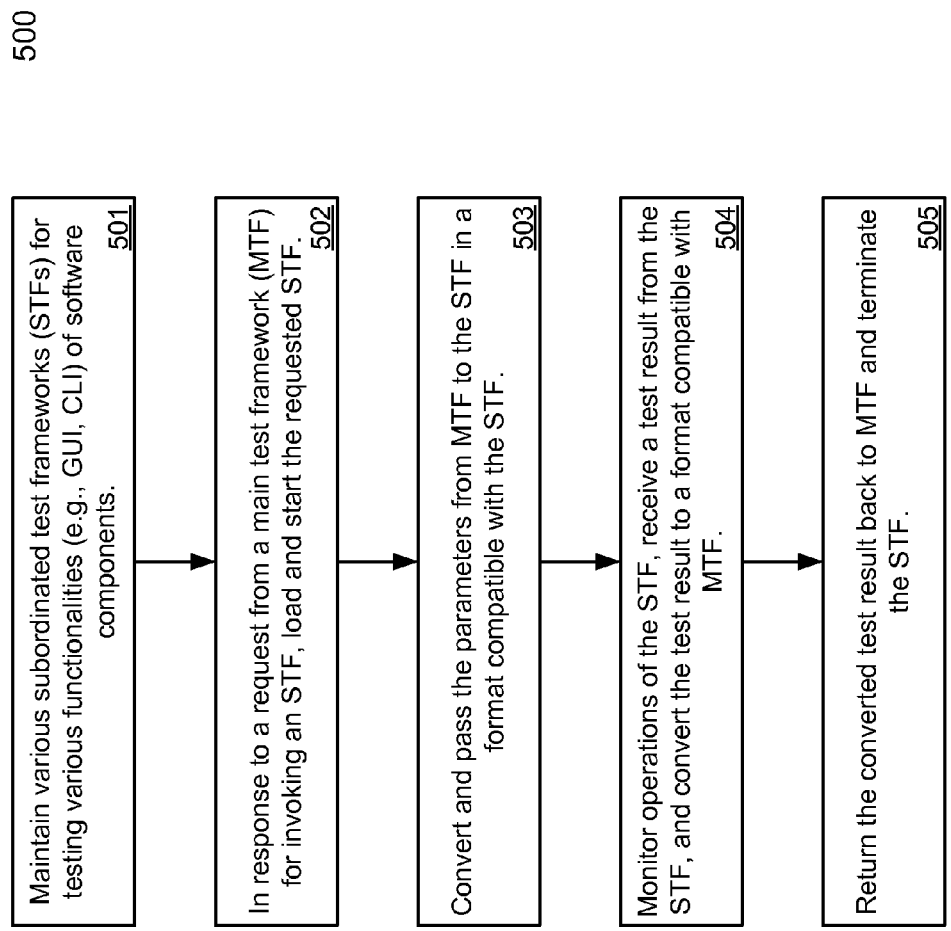
FIG. 5 is a flow diagram illustrating a method for testing software components using heterogeneous subordinated test frameworks according to one embodiment of the invention.

FIG. 5 is a flow diagram illustrating a method for testing software components using heterogeneous subordinated test frameworks according to one embodiment of the invention. Method 500 may be performed by processing logic which may include software, hardware, or a combination thereof. For example, method 500 may be performed by system 200 of FIG. 2. Referring to FIG. 5, at block 501, various STFs are maintained for testing various functionalities (e.g., GUI, CLI) of software components. At block 502, in response to a request from an MTF for invoking an STF, processing logic loads and starts the requested STF. At block 503, processing logic converts and passes the parameters from MTF to the STF in a format compatible with the STF to allow the STF to perform specific testing functions based on the input parameters. At block 504, processing logic monitors operations of the STF, receives a test result from the STF, and converts the test result to a format compatible with the MTF. At block 505, the converted test result is then returned back to the MTF and the STF is terminated.

Figure 6:
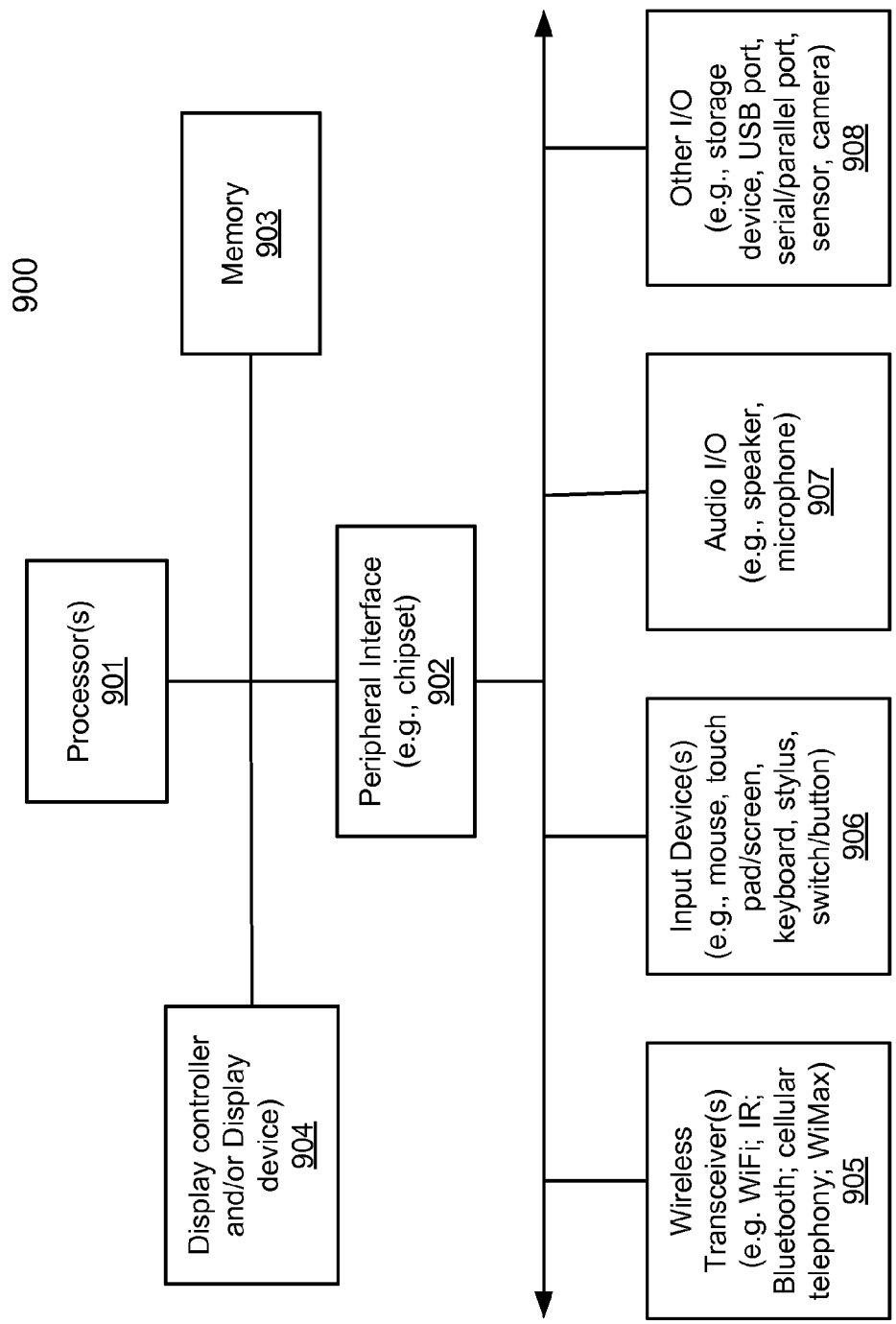
FIG. 6 is a block diagram illustrating an example of a data processing system which may be used with one embodiment of the invention.

FIG. 6 is a block diagram illustrating an example of a data processing system which may be used with one embodiment of the invention. For example, system 900 may represents a testing station performing any of the processes or methods described above. For example, the MTF, STFs, and MTS/STF adaptor as described above may be executed by processor 901 in memory 903. System 900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 6, in one embodiment, system 900 includes processor 901 and peripheral interface 902, also referred to herein as a chipset, to couple various components to processor 901 including memory 903 and devices 905-908 via a bus or an interconnect. Processor 901 may represent a single processor or multiple processors with a single processor core or multiple processor cores included therein. Processor 901 may represent one or more general-purpose processors such as a microprocessor, a central processing unit (CPU), or the like. More particularly, processor 901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 901 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 901 is configured to execute instructions for performing the operations and steps discussed herein.

Peripheral interface 902 may include memory control hub (MCH) and input output control hub (ICH). Peripheral interface 902 may include a memory controller (not shown) that communicates with a memory 903. Peripheral interface 902 may also include a graphics interface that communicates with graphics subsystem 904, which may include a display controller and/or a display device. Peripheral interface 902 may communicate with graphics device 904 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 901. In such a configuration, peripheral interface 902 operates as an interface chip performing some functions of the MCH and ICH. Furthermore, a graphics accelerator may be integrated within the MCH or processor 901.

Memory 903 may include one or more volatile storage (or memory) devices such as random access memory (RAM), dynamic RAM (DRAM), synchronous DRAM (SDRAM), static RAM (SRAM), or other types of storage devices. Memory 903 may store information including sequences of instructions that are executed by processor 901, or any other device. For example, executable code and/or data of a variety of operating systems, device drivers, firmware (e.g., input output basic system or BIOS), and/or applications can be loaded in memory 903 and executed by processor 901. An operating system can be any kind of operating systems, such as, for example, Windows® operating system from Microsoft®, Mac OS®/iOS from Apple, Android® from Google®, Linux®, Unix®, or other real-time or embedded operating systems such as VxWorks.

Peripheral interface 902 may provide an interface to 10 devices such as devices 905-908, including wireless transceiver(s) 905, input device(s) 906, audio 10 device(s) 907, and other IO devices 908. Wireless transceiver 905 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 906 may include a mouse, a touch pad, a touch sensitive screen (which may be integrated with display device 904), a pointer device such as a stylus, and/or a keyboard (e.g., physical keyboard or a virtual keyboard displayed as part of a touch sensitive screen). For example, input device 906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 907 may include a speaker and/or a microphone to facilitate voice-enabled functions, such as voice recognition, voice replication, digital recording, and/or telephony functions. Other optional devices 908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 6 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for testing heterogeneous functionalities of software components, the method comprising:
   receiving a test procedure specifying a sequence of testing operations on a software component;
   in response to the test procedure, identifying, by a main test framework (MTF), one or more test cases associated the sequence of testing operations;
   in response to a first of the one or more test cases, delegating, by the MTF, at least one testing operation to a first subordinated test framework (STF) by invoking an MTF-to-STF (MTF/STF) adaptor via an MTF application programming interface (API) of the MTF/STF adaptor, wherein the first STF is one of a plurality of STFs, each corresponding to a test operation of a specific functionality;
   executing, by the MTF/STF adaptor, the first STF by passing a first set of parameters received from the MTF to a first format compatible with the first STF via a first STF API of the MTF/STF adaptor, wherein the first STF is configured to perform a first sequence of testing operations for a first functionality, wherein the MTF/STF adaptor includes a plurality of STF APIs, each coupling with one of a plurality of STFs to allow the MTF to communicate with a corresponding STF via the MTF/STF adaptor; and in response to a first test result from the first STF, converting, by the MTF/STF adaptor, the first test result in second format compatible with the MTF; and returning, by the MTF/STF adaptor, the converted first test result back to the MTF, such that the MTF does not need to know how to communicate with the first STF.

2. The method of claim 1, wherein the one or more test cases are identified from a pool of a plurality of test cases that have been previously configured to perform predetermined set of functionalities.

3. The method of claim 2, wherein the one or more test cases are identified based on corresponding test case identifiers specified by the testing procedure.

4. The method of claim 2, further comprising invoking, by the MTF, a set of libraries associated with the first test case, wherein the set of libraries is previously configured to test a set of general functionalities, and the first STF is to test a set of specific functionalities.

5. The method of claim 4, further comprising:
in response to a second of the test cases specified in the testing procedure, calling, by the MTF, the MTF/STF adaptor to invoking a second of the STFs, wherein the second STF is configured to perform a second sequence of testing operations for a second functionality that is different than the first functionality;
the MTF/STF adaptor converting a second set of parameters received from the MTF to a third format that is compatible with the second STF;
in response to a second test result received from the second STF, the MTF/STF adaptor converting the second test result to the second format compatible with the MTF; and
returning, by the MTF/STF adaptor, the converting second test result back to the MTF.

6. The method of claim 5, wherein the MTF/STF adaptor is configured to communicate with the MTF via a first application programming interface (API), wherein the MTF/STF adaptor is configured to communicate with the first STF via a second API, and wherein the MTF/STF adaptor is configured to communicate with the second STF via a third API that is different than the second API.

7. The method of claim 5, further comprising terminating, by the MTF/STF adaptor, the first STF and second STF after returning the first and second results back to the MTF, respectively.

8. The method of claim 7, wherein the first STF is developed by a first software provider, and wherein the second STF is developed by a second software provider that is different than the first software provider.

9. The method of claim 8, wherein the first STF is configured to test a graphical user interface (GUI) functionality, and wherein the second STF is configured to test a command line interface (CLI) functionality.

10. A non-transitory machine-readable medium having instructions stored therein, which when executed by a processor, cause the processor to perform operations for testing heterogeneous functionalities of software components, the operations comprising:
receiving a test procedure specifying a sequence of testing operations on a software component;
in response to the test procedure, identifying, by a main test framework (MTF), one or more test cases associated the sequence of testing operations;
in response to a first of the one or more test cases, delegating, by the MTF, at least one testing operation to a first subordinated test framework (STF) by invoking an MTF-to-STF (MTF/STF) adaptor via an MTF application programming interface (API) of the MTF/STF adaptor, wherein the first STF is one of a plurality of STFs, each corresponding to a test operation of a specific functionality;
executing, by the MTF/STF adaptor, the first STF by passing a first set of parameters received from the MTF to a first format compatible with the first STF via a first STF API of the MTF/STF adaptor, wherein the first STF is configured to perform a first sequence of testing operations for a first functionality, wherein the MTF/STF adaptor includes a plurality of STF APIs, each coupling with one of a plurality of STFs to allow the MTF to communicate with a corresponding STF via the MTF/STF adaptor; and
in response to a first test result from the first STF, converting, by the MTF/STF adaptor, the first test result in second format compatible with the MTF; and
returning, by the MTF/STF adaptor, the converted first test result back to the MTF, such that the MTF does not need to know how to communicate with the first STF.

11. The non-transitory machine-readable medium of claim 10, wherein the one or more test cases are identified from a pool of a plurality of test cases that have been previously configured to perform predetermined set of functionalities.

12. The non-transitory machine-readable medium of claim 11, wherein the one or more test cases are identified based on corresponding test case identifiers specified by the testing procedure.

13. The non-transitory machine-readable medium of claim 11, wherein the operations further comprise invoking, by the MTF, a set of libraries associated with the first test case, wherein the set of libraries is previously configured to test a set of general functionalities, and the first STF is to test a set of specific functionalities.

14. The non-transitory machine-readable medium of claim 13, wherein the operations further comprise:
in response to a second of the test cases specified in the testing procedure, calling, by the MTF, the MTF/STF adaptor to invoking a second of the STFs, wherein the second STF is configured to perform a second sequence of testing operations for a second functionality that is different than the first functionality;
the MTF/STF adaptor converting a second set of parameters received from the MTF to a third format that is compatible with the second STF;
in response to a second test result received from the second STF, the MTF/STF adaptor converting the second test result to the second format compatible with the MTF; and
returning, by the MTF/STF adaptor, the converting second test result back to the MTF.

15. The non-transitory machine-readable medium of claim 14, wherein the MTF/STF adaptor is configured to communicate with the MTF via a first application programming interface (API), wherein the MTF/STF adaptor is configured to communicate with the first STF via a second API, and wherein the MTF/STF adaptor is configured to communicate with the second STF via a third API that is different than the second API.

16. The non-transitory machine-readable medium of claim 14, wherein the operations further comprise terminating, by the MTF/STF adaptor, the first STF and second STF after returning the first and second results back to the MTF, respectively.

17. The non-transitory machine-readable medium of claim 16, wherein the first STF is developed by a first software provider, and wherein the second STF is developed by a second software provider that is different than the first software provider.

18. The non-transitory machine-readable medium of claim 17, wherein the first STF is configured to test a graphical user interface (GUI) functionality, and wherein the second STF is configured to test a command line interface (CLI) functionality.

19. A data processing system, comprising:
a processor; and
a memory coupled to the processor for storing instructions, which when executed from the memory, cause the processor to perform operations, the operations including
receiving a test procedure specifying a sequence of testing operations on a software component,
in response to the test procedure, identifying, by a main test framework (MTF) executed in the memory, one or more test cases associated the sequence of testing operations,
in response to a first of the one or more test cases, delegating, by the MTF, at least one testing operation to a first subordinated test framework (STF) by invoking an MTF-to-STF (MTF/STF) adaptor via an MTF application programming interface (API) of the MTF/STF adaptor, wherein the first STF is one of a plurality of STFs, each corresponding to a test operation of a specific functionality,
launching, by the MTF/STF adaptor in the memory, the first STF by passing a first set of parameters received from the MTF to a first format compatible with the first STF via a first STF API of the MTF/STF adaptor, wherein the first STF is configured to perform a first sequence of testing operations for a first functionality, wherein the MTF/STF adaptor includes a plurality of the STF APIs, each coupling with one of a plurality of STFs to allow the MTF to communicate with a corresponding STF via the MTF/STF adaptor,
in response to a first test result from the first STF, converting, by the MTF/STF adaptor, the first test result in second format compatible with the MTF, and
returning, by the MTF/STF adaptor, the converted first test result back to the MTF, such that the MTF does not need to know how to communicate with the first STF.

20. The system of claim 19, wherein the one or more test cases are identified from a pool of a plurality of test cases that have been previously configured to perform predetermined set of functionalities.

21. The system of claim 20, wherein the one or more test cases are identified based on corresponding test case identifiers specified by the testing procedure.

22. The system of claim 20, wherein the operations further comprise invoking, by the MTF, a set of libraries associated with the first test case, wherein the set of libraries is previously configured to test a set of general functionalities, and the first STF is to test a set of specific functionalities.

* * * * *